United States Patent
Wakita et al.

(10) Patent No.: US 7,534,494 B2
(45) Date of Patent: May 19, 2009

(54) COMPOSITE FORMED BODY AND METHOD FOR PRODUCING SAME

(75) Inventors: Naoki Wakita, Himeji (JP); Mitsuteru Mutsuda, Himeji (JP); Hiroaki Arita, Himeji (JP); Hajime Komada, Himeji (JP); Toru Ikuta, Kobe (JP)

(73) Assignee: Daicel-Evonik Ltd., Tokyo (JP)

( * ) Notice: Subject to any disclaimer, the term of this patent is extended or adjusted under 35 U.S.C. 154(b) by 587 days.

(21) Appl. No.: 10/536,393

(22) PCT Filed: Dec. 1, 2003

(86) PCT No.: PCT/JP03/15309

§ 371 (c)(1),
(2), (4) Date: May 26, 2005

(87) PCT Pub. No.: WO2004/050363

PCT Pub. Date: Jun. 17, 2004

(65) Prior Publication Data

US 2006/0108708 A1      May 25, 2006

(30) Foreign Application Priority Data

Dec. 2, 2002   (JP) .............................. 2002-350043
Oct. 17, 2003  (JP) .............................. 2003-358541

(51) Int. Cl.
*B32B 27/34* (2006.01)
*B32B 27/40* (2006.01)
*B28B 5/00* (2006.01)

(52) U.S. Cl. .................. 428/423.5; 264/241; 156/308.2

(58) Field of Classification Search ............. 428/423.1, 428/423.5, 474.4; 525/474, 479; 528/44; 264/241; 156/308.2
See application file for complete search history.

(56) References Cited

U.S. PATENT DOCUMENTS

| 4,410,595 | A  | * | 10/1983 | Matsumoto et al. | ......... 428/412 |
| 5,449,024 | A  |   | 9/1995  | Rober et al.     |                   |
| 6,800,372 | B2 | * | 10/2004 | Ikuta et al.     | ................. 428/447 |
| 7,175,916 | B2 | * | 2/2007  | Ikuta et al.     | ............... 428/476.9 |

FOREIGN PATENT DOCUMENTS

| EP | 0 382 236 A2    | 8/1990  |
| EP | 0 392 847 A2    | 10/1990 |
| JP | 7-125155 A      | 5/1995  |
| JP | 8-267585 A      | 10/1996 |
| JP | 2001-179871 A   | 7/2001  |
| WO | WO-95/12481 A1  | 5/1995  |
| WO | WO-02/055296 A  | 7/2002  |
| WO | WO-02/055297 A1 | 7/2002  |

* cited by examiner

*Primary Examiner*—Thao T. Tran
(74) *Attorney, Agent, or Firm*—Birch, Stewart, Kolasch & Birch, LLP

(57) ABSTRACT

In a molded composite article formed by directly joining a resin member comprising a polyamide-series resin to a resin member comprising a thermoplastic polyurethane-series resin, as the polyamide-series resin, a polyamide-series resin having an amino group of not less than 10 mmol/kg is used. The molded composite article may be produced by heating at least any one of the polyamide-series resin and the thermoplastic polyurethane-series resin to join to the other resin.

21 Claims, No Drawings

COMPOSITE FORMED BODY AND METHOD FOR PRODUCING SAME

TECHNICAL FIELD

The present invention relates to a molded composite article in which a resin member comprising a specific polyamide-series resin is joined to a resin member comprising a thermoplastic polyurethane in a one-piece construction without an adhesive, and a process for producing the same.

BACKGROUND ART

In order to improve design or decorative property or to impart excellent touch or texture (e.g., soft texture), composites (molded composite articles) formed with a combination of a plurality of resins each having a different hardness, for example, a molded composite article in which at least part of a resin molded article is coated with a thermoplastic elastomer, have been proposed. Such a molded composite article is usually produced by adhesion of a plurality of molded members through an adhesive. For example, Japanese Patent Application Laid-Open No. 267585/1996 (JP-8-267585A) discloses a resin molded article in which a plurality of resin molded articles formed with a polyamide resin or others are adhered to each other through a finishing agent such as a urethane polymer or a urethane adhesive. However, such a process using an adhesive is not only uneconomical due to complicated steps, but also has problems such as environmental pollution by an organic solvent or others.

On the other hand, from the viewpoint of rationalization of production processes or environmental protection, a process for thermal fusing of a plurality of molded members has been adopted. The molded composite article obtained by thermal fusing is usually manufactured by a molding process such as a two-color (or double) molding or an insert molding. However, combination of different materials allowing of thermal fusing is significantly limited. Moreover, it is not easy to establish molding conditions to ensure enough bonded strength. Therefore, in addition to thermal fusing, the fused part is reinforced by a combination use of a process for creating a concavo-convex site (or part) in the composite area of the molded member to join mechanically, or a process for coating a primer or others on the joining (or fusing) part, or other methods. In such a method, however, the molded composite article is deteriorated in flexuous property. For example, the hardened primer layer easily forms a crack by bending. Moreover, the production process needs to complicate the structure of the molded member, resulting in increase of the number of the production steps.

In order to solve these problems, it has been investigated to use a thermoplastic polyurethane as a material for a resin member constituting a molded composite article. The thermoplastic polyurethane itself is relatively excellent in adhesiveness. For example, in a used for shoe(s), a molded composite plastic article comprising a polyamide resin and a thermoplastic polyurethane is practically used as a shoe sole. Moreover, Japanese Patent Application Laid-Open No. 505333/1996 (JP-8-505333A) discloses that a lightened shoe sole is obtained by injection-molding a polyamide elastomer containing a foaming agent into a mold, inserting or putting a molded article of a thermoplastic resin such as a polyether amide, a polyether ester or a polyurethane in a mold, and adhering to the thermoplastic resin molded article (un-lightweight (un-lightened) plastic) and the elastomer (lightweight thermoplastic elastomer). Japanese Patent Application Laid-Open No. 125155/1995 (JP-7-125155A) discloses a molded composite article in which a rigid plastic molded member formed of a blended matter of a polypropylene and a polyamide is coated with a nonrigid (or flexible) plastic containing a thermoplastic polyurethane and a plasticizer by thermal fusing. However, even in such a molded composite article (for example, a molded composite article using a polyurethane resin), the adhesive strength between two materials (e.g., an adhesive strength relative to a polyamide elastomer as a counterpart member) has not been enough yet. Therefore, such a composite is affected by not only conditions for molding or conditions of materials to be used (e.g., production lot) but also environment to be used of the product (molded composite article), resulting in unstableness of the adhesive strength or the duration of the molded composite article (particularly the duration of the adhered site).

It is therefore an object of the present invention to provide a molded composite article in which, even using a polyamide-series resin member and a thermoplastic polyurethane-series resin member different in character from each other, the both members are directly and firmly joined together without an adhesive, and a process for producing the same.

It is another object of the present invention to provide a process for producing a molded composite article in which a polyamide-series resin member and a thermoplastic polyurethane resin member are firmly joined together by thermal fusing in a convenient manner without going through complicated production steps.

DISCLOSURE OF THE INVENTION

The inventors of the present invention made intensive studies to achieve the above objects and finally found that combination use of a polyamide-series resin having a specific content of an amino group and a thermoplastic polyurethane-series resin ensures firm joining (or bonding) between a resin member of the polyamide-series resin and a resin members of the polyurethane-series resin. The present invention was accomplished based on the above findings.

That is, the molded composite article of the present invention comprises (Ia) a resin member comprising a polyamide-series resin and (IIa) a resin member comprising a thermoplastic polyurethane-series resin, and the resin member (Ia) is directly joined or bonded to the resin member (IIa), and the polyamide-series resin has an amino group(s) in a proportion of not less than 10 mmol/kg.

The polyamide-series resin constituting the resin member (Ia) may be the following resin (A) or (B):

(A) a polyamide-series resin which is (Ib-1) a single polyamide-series resin, or (Ib-2) a mixture of a plurality of polyamide-series resins each having different amino group content from each other, and which has an amino group(s) in a proportion of not less than 20 mmol/kg, (B) a polyamide-series resin which is (Ib-3) a resin composition containing a polyamide-series resin and a compound having an amino group(s) (amine compound), and which has an amino group(s) in a proportion of not less than 10 mmol/kg.

Moreover, the polyamide-series resin constituting the resin member (Ia) may be an aliphatic polyamide-series resin, an alicyclic polyamide-series resin, an aromatic polyamide-series resin, a polyamide block copolymer, and others. In the resin composition (Ib-3), the compound having an amino group may be at least one member selected from the group consisting of a monoamine, a polyamine, and a polyamide oligomer, and the proportion of the compound having an amino group may be about 0.01 to 10 parts by weight relative to 100 parts by weight of the base polyamide-series resin.

The polyamide-series resin constituting the resin member (Ia) may comprise a polyamide oligomer, and at least one base polyamide resin selected from the group consisting of an aliphatic polyamide-series resin, an alicyclic polyamide-series resin, and a polyamide block copolymer. The thermoplastic polyurethane-series resin may comprise a thermoplastic polyurethane elastomer.

In the molded composite article, a polyamide-series resin having a terminal amino group, and a thermoplastic polyurethane-series resin comprising a polyester polyurethane obtained from a polyester diol may be used in combination.

In the molded composite article, (Ib) a polyamide-series resin having an amino group (e.g., a polyamide-series resin comprising at least one member selected from the group consisting of an aliphatic polyamide-series resin, an alicyclic polyamide-series resin, and an aromatic polyamide-series resin) may be used in combination with (IIb) a thermoplastic polyurethane-series resin comprising at least one member selected from the group consisting of a polyether urethane elastomer, a polyester urethane elastomer, a polyester ether urethane elastomer, and a polycarbonate urethane elastomer. Moreover, in the molded composite article, (Ib) a polyamide-series resin comprising at least a polyamide block copolymer may be used in combination with (IIb) a thermoplastic polyurethane-series resin comprising at least one member selected from the group consisting of a polyether urethane elastomer, a polyester urethane elastomer, a polyester ether urethane elastomer, and a polycarbonate urethane elastomer; and the polyamide block copolymer may be a polyamide elastomer having in a molecule thereof at least one member selected from the group consisting of a polyether segment, a polyester segment, and a polycarbonate segment.

The molded composite article of the present invention is, for example, suitable for a member of a shoe or a roll.

Such a molded composite article may be produced by heating at least one resin selected from the group consisting of (Ib) the resin comprising a polyamide-series resin and (IIb) the resin comprising a thermoplastic polyurethane-series resin to join one resin to the other resin. For example, the thermoplastic polyurethane-series resin may be melted or fused under heating, and the molten thermoplastic polyurethane-series resin may be brought into contact with at least part of a resin member comprising the polyamide-series resin for uniting both resins. Moreover, the polyamide-series resin may be melted or fused under heating, and the molten polyamide-series resin may be brought into contact with at least part of a resin member comprising the thermoplastic polyurethane-series resin for uniting both resins. Further, the polyamide-series resin and the thermoplastic polyurethane-series resin may be independently melted or fused under heating, and the molten polyamide-series resin may be brought into contact with the molten thermoplastic polyurethane-series resin for uniting both resins. Furthermore, the polyamide-series resin and the thermoplastic polyurethane-series resin may be joined and united by a molding method selected from the group consisting of a thermoforming, an injection molding, an extrusion molding, and a blow molding.

Incidentally, throughout this specification, the meaning of the term "resin" includes "a resin composition". Moreover, throughout this specification, the term "adhesion (or adhering)" means a technique for compounding a plurality of members through an adhesive, the term "joining (or bonding)" means a technique for compounding a plurality of members without an adhesive, and the both terms are distinguished from each other. Fusing (or thermal fusing) is one embodiment of joining.

DETAILED DESCRIPTION OF THE INVENTION

[Molded Composite Article]

The molded composite article of the present invention comprises (Ia) a resin member comprising a polyamide-series resin, and (IIa) a resin member comprising a thermoplastic polyurethane-series resin, directly joining to the polyamide-series resin member.

(Polyamide-Series Resin)

As the polyamide-series resin, there may be mentioned an aliphatic polyamide-series resin, an alicyclic polyamide-series resin, an aromatic polyamide-series resin, or others, and various homopolyamides and copolyamides may be used.

Among the aliphatic polyamide-series resins, the homopolyamide includes a condensation product of an aliphatic diamine component [e.g., a $C_{4-16}$alkylenediamine such as tetramethylenediamine, hexamethylenediamine, or dodecanediamine (preferably a $C_{4-14}$alkylenediamine, particularly a $C_{6-12}$alkylenediamine)] and an aliphatic dicarboxylic acid component [e.g., an alkanedicarboxylic acid having about 4 to 20 carbon atoms, such as adipic acid, sebacic acid, or dodecanoic diacid (preferably a $C_{4-16}$alkanedicarboxylic acid, and particularly a $C_{6-14}$alkanedicarboxylic acid)], for example, a polyamide 46, a polyamide 66, a polyamide 610, a polyamide 612, and a polyamide 1010; a homopolyamide of a lactam [e.g., alactam having about 4 to 20 (preferably about 4 to 16) carbon atoms, such as ε-caprolactam or ω-laurolactam] or an aminocarboxylic acid [e.g., an aminocarboxylic acid having about 4 to 20 (preferably about 4 to 16) carbon atoms, such as ω-aminoundecanoic acid], for example, a polyamide 6, a polyamide 11, and a polyamide 12; and others. Moreover, the copolyamide includes a copolyamide which is obtained by copolymerization of a monomer component capable of constituting a polyamide, e.g., the aliphatic diamine components, the aliphatic dicarboxylic acid components, the lactams and the aminocarboxylic acids. Examples of the copolyamide include a copolymer of 6-aminocaproic acid and 12-aminododecanoic acid; a copolymer of 6-aminocaproic acid, 12-aminododecanoic acid, hexamethylenediamine and adipic acid; a copolymer of hexamethylenediamine, adipic acid, hydrogenated dimer acid and 12-aminododecanoic acid; a polyamide 6/11, a polyamide 6/12, a polyamide 66/11, a polyamide 66/12; and others.

The alicyclic polyamide-series resin includes a homopolyamide or copolyamide having at least one component selected from the group consisting of at least an alicyclic diamine and an alicyclic dicarboxylic acid as a constitutive component. For example, there may be used an alicyclic polyamide obtained by using an alicyclic diamine and/or an alicyclic dicarboxylic acid as at least one component among a diamine component and a dicarboxylic acid component each constituting a polyamide-series resin. As the diamine component and the dicarboxylic acid component, the above-mentioned aliphatic diamine(s) and/or aliphatic dicarboxylic acid(s) are preferably used in combination with the alicyclic diamine (s) and/or alicyclic dicarboxylic acid(s). Such an alicyclic polyamide-series resin has high transparency, and is known as a so-called transparent polyamide.

Examples of the alicyclic diamine include a diaminocycloalkane such as diaminocyclohexane (e.g., a diamino $C_{5-10}$cycloalkane); a bis(aminocycloalkyl)alkane such as bis (4-aminocyclohexyl)methane, bis(4-amino-3-methylcyclohexyl)methane, or 2,2-bis(4'-aminocyclohexyl)propane [e.g., a bis(amino$C_{5-8}$cycloalkyl)$C_{1-13}$alkane]; a hydrogenated xylylenediamine and others. Moreover, the alicyclic dicarboxylic acid includes a cycloalkanedicarboxylic acid such as cyclohexane-1,4-dicarboxylic acid or cyclohexane-1,3-dicarboxylic acid (for example, a $C_{5-10}$cycloalkane-dicarboxylic acid), and others.

Among the alicyclic polyamide-series resins, for example, a condensation product (a homo- or copolyamide) of the aliphatic dicarboxylic acid and the alicyclic diamine is preferred.

The aromatic polyamide-series resin includes a polyamide in which at least one component of the aliphatic diamine component and the aliphatic dicarboxylic acid component in the above aliphatic polyamide comprises an aromatic component, for example, a polyamide having an aromatic component in a diamine component [for example, a condensation product of an aromatic diamine (e.g., metaxylylenediamine) and an aliphatic dicarboxylic acid, such as MXD-6], a polyamide having an aromatic component in a dicarboxylic acid component [e.g., a condensation product of an aliphatic diamine (e.g., trimethylhexamethylenediamine) and an aromatic dicarboxylic acid (e.g., terephthalic acid, isophthalic acid)], and others.

Incidentally, in the polyamide-series resin, a polyamide in which both a diamine component and a dicarboxylic acid component comprise an aromatic component [for example, a fully aromatic amide such as a poly(m-phenyleneisophthalamide) (e.g., Aramid)] may be used in combination.

The polyamide-series resin further includes a polyamide comprising a dimer acid as a dicarboxylic acid component, a polyamide in which a branched chain structure is introduced by using a small amount of a polyfunctional polyamine and/or polycarboxylic acid component, a modified polyamide (e.g., a N-alkoxymethylpolyamide), a polyamide block copolymer, and a composition thereof, and others.

Examples of the polyamide block copolymer include a polyamide-polyether block copolymer, a polyamide-polyester block copolymer, and a polyamide-polycarbonate block copolymer.

In these block copolymers, there may be used, as a block component, a diol component such as an aliphatic diol [for example, an aliphatic diol having about 2 to 12 carbonatoms, e.g., a linear (or chain) aliphatic diol (e.g., ethylene glycol, propylene glycol, tetramethylene glycol, hexanediol, 1,9-nonanediol), and a branched aliphatic diol (e.g., 2-methyl-1,3-propanediol, 3-methyl-1,5-pentanediol, 2-methyl-1,8-octanediol, 2,2-diethyl-1,3-propanediol)], an alicyclic diol, and an aromatic diol [for example, a dihydroxyarene which may have a substituent (e.g., a dihydroxy$C_{6-12}$arene such as dihydroxybenzene, dihydroxytoluene, or dihydroxybiphenyl), a bisarylalkane which may have a substituent (e.g., a bis(hydroxy$C_{6-10}$aryl)-chain or branched $C_{1-4}$alkane, such as bisphenol A)], and/or a dicarboxylic acid component such as an aliphatic dicarboxylic acid (an alkanedicarboxylic acid having about 4 to 20 carbon atoms, such as adipic acid, sebacic acid, or dodecanoic diacid), an alicyclic dicarboxylic acid (a cycloalkanedicarboxylic acid having 5 to 10 carbon atoms, such as cyclohexane-1,4-dicarboxylic acid, or cyclohexane-1,3-dicarboxylic acid), and an aromatic dicarboxylic acid (e.g., terephthalic acid, isophthalic acid).

The polyamide-ether block copolymer includes, for example, a polyamide copolymer having in a molecule thereof a polyether comprising at least one member selected from the above-mentioned diol components as one of a block or segment. Moreover, the polyamide-polyester block copolymer includes a polyamide copolymer having in a molecule thereof a polyester as one of a block or segment, where the polyester is obtained by polycondensation of at least one member selected from the diol components and at least one member selected from the dicarboxylic acid components. The polycarbonate-polyamide block copolymer includes a polyamide copolymer having in a molecule thereof a polycarbonate ester of at least one diol selected from the diol components as one of a block or a segment.

In the polyamide block copolymer, a polyether block, a polyester block and/or a polycarbonate block which are contained in the copolymer are often used for the purpose of imparting softness or flexibility to the polyamide (as a soft block). A polyamide block copolymer having both such a soft block (or soft segment) and a polyamide block (hard block or hard segment) is referred to as a polyamide elastomer.

The polyamide block copolymer is obtained by copolycondensation of a polyamide block having a reactive end group, and any one of a polyether block, a polyester block and a polycarbonate block each having a reactive end group, or a combination thereof. For example, a polyether polyamide block copolymer of a polyether amide-series is obtained by copolycondensation of a polyamide block having an amino group as the end group and a polyoxyalkylene block having a carboxyl group as the end group, or by copolycondensation of a polyamide block having a carboxyl group as the end group and a polyoxyalkylene block having an amino group as the end group. Moreover, a polyether polyamide block copolymer of a polyether ester amide-series is obtained by polycondensation of a polyamide block having a carboxyl group as the end group and a polyoxyalkylene block having a hydroxyl group as the end group. These copolymers are generally known as a polyamide elastomer. Incidentally, commercially available polyamide elastomers are hardly free from an amino group in many cases. Throughout this specification, the polyamide block copolymer includes a copolymer obtained by copolycondensation of the above-described polyamide block and other block(s) (e.g., a polyether block, a polyester block, a polycarbonate block), in addition a polyamide block copolymer obtained by polyaddition of various diisocyanates to at least one of a polyether block, a polyester block and a polycarbonate block each having carboxyl groups at both ends, if necessary under coexistence with the dicarboxylic acid component, and decarboxylation of the resulting product.

Among the polyamide block copolymers, a polyether polyamide block copolymer, in particular a polyamide elastomer containing a polyether segment as a soft segment, is preferred.

In the polyamide elastomer, the molecular weight (or weight-average molecular weight) of the polyoxyalkylene glycol constituting the polyether segment may for example be selected within a range from about 100 to 10000, and may be preferably about 300 to 6000 (e.g., about 300 to 5000) and more preferably about 500 to 4000 (e.g., about 500 to 3000).

Incidentally, the proportion of the polyether segment in the polyamide elastomer may for example be about 10 to 90 wt. % (e.g., about 10 to 80 wt. %), preferably about 20 to 90 wt. % (e.g., about 20 to 75 wt. %), and more preferably about 30 to 90 wt. % (e.g., about 30 to 70 wt. %) relative to the whole polyamide-series resin (or composition) constituting the resin member. Moreover, in the polyamide elastomer, the ratio (weight ratio) of the polyamide segment relative to the polyether segment (e.g., a PTMG segment) is not particularly limited to a specific one, and for example, the former/the latter may be about 9/1 to 2/8, preferably about 9/1 to 2.5/7.5, more preferably about 8/2 to 3/7, and particularly 7/3 to 4/6.

The polyamide-series resin(s) may be used singly or in combination. Moreover, the polyamide-series resin may be a blend or alloy comprising a plurality of polyamide-series resins.

The preferred polyamide-series resin includes the aliphatic polyamide-series resin, the alicyclic polyamide-series resin (in particular, the transparent polyamide), and others. These preferred polyamide-series resins may be used in combination with the aromatic polyamide-series resin. Further, the polyamide block copolymer (polyamide elastomer) is also preferred.

The number average molecular weight of the polyamide-series resin is about 6,000 to 100,000, preferably about 8,000 to 50,000, and more preferably about 10,000 to 30,000.

In the present invention, the polyamide-series resin (or resin composition) (Ib) constituting the resin member (Ia) has an amino group at a specific concentration. The amino group usually shows a free amino group ($-NH_2$ group) and usually does not include a $-NH-$ (imino) group and $-N<$ group derived from an amide bond constituting the main chain of the polyamide-series resin, a urea bond, a urethane bond and other bond. The polyamide-series resin may have the free amino group in a branched chain thereof, or at the end of a main chain thereof.

The content (or concentration) of the amino group (or amino group concentration) in the polyamide-series resin (or containing a resin composition) (Ib) is, relative to 1 kg of the polyamide-series resin (Ib), not less than 10 mmol (e.g., about 10 to 300 mmol), preferably not less than 15 mmol (e.g., about 15 to 200 mmol), more preferably not less than 20 mmol (e.g., about 20 to 150 mmol), and particularly not less than 30 mmol (e.g., about 30 to 100 mmol). Moreover, the concentration may for example be about 35 to 300 mmol, preferably about 40 to 200 mmol, and more preferably about 50 to 150 mmol relative to 1 kg of the polyamide-series resin (Ib). In particular, the polyamide-series resin (Ib) preferably contains a terminal amino group at a range of such a content.

The content of the amino group may be adjusted by a conventional method, for example, (a) a method of adjusting a proportion of a diamine component constituting a polyamide-series resin; (b) a method of forming a blend or alloy by combining a plurality of polyamide-series resins different in amino group concentration from each other (e.g. by using a polyamide-series resin having an amino group at a low concentration in combination with a polyamide-series resin having an amino group at a high concentration); and (c) a method of involving a compound having an amino group (e.g., an amino group-containing compound having an amino group at a high concentration and having a relatively low molecular weight) in a polyamide-series resin (e.g., a polyamide having an amino group at a low concentration, such as the polyamide block copolymer (e.g., a polyamide elastomer) described above). For example, in a copolycondensation of a block having amino groups at the both ends and a block having carboxyl groups at the both ends, introduction of an amino group into the polyamide block copolymer (e.g., a polyamide elastomer) may be conducted by increasing the proportion of the block having amino groups at the both ends, or by adding an amino group-containing compound miscible with a polyamide-series resin at an adequate amount in addition to the polyamide-series resin.

In the case where the polyamide-series resin comprises only a polyamide resin (Ib-1), the amino group concentration may be adjusted by a method such as the above-mentioned method (a). Moreover, in the case where the polyamide-series resin is a mixture (Ib-2) containing a plurality of polyamide-series resins and prepared by the above-mentioned method (b), the amino group concentration of each polyamide-series resin may be suitably adjusted by the method (a) and/or (c) described above.

When the polyamide-series resin is a single polyamide-series resin (e.g., a resin prepared by the method (a)), or a mixture containing a plurality of polyamide-series resins different in amino group concentration from each other (e.g., a mixture prepared by the method (b)), the amino group concentration of the polyamide-series resin (or composition) (Ib) may for example be not less than 20 mmol/kg (e.g., about 20 to 300 mmol/kg), preferably not less than 30 mmol/kg (e.g., about 30 to 200 mmol/kg), more preferably not less than 40 mmol/kg (e.g., about 40 to 150 mmol/kg), and particularly not less than 50 mmol/kg (e.g., about 50 to 100 mmol/kg).

In the case using a plurality of polyamide-series resins different in amino group concentration from each other in combination, the total content of the amino group in the polyamide-series resins may for example be adjusted by using a polyamide-series resin having an amino group concentration of about 0 to 30 mmol/kg (e.g., about 0 to 20 mmol/kg) in combination with a polyamide-series resin having an amino group concentration of about 40 to 400 mmol/kg (preferably about 50 to 300 mmol/kg, and particularly about 100 to 200 mmol/kg). The proportion of the polyamide-series resin having an amino group at a higher concentration may be such a proportion that the mean concentration of the amino group corresponds to the above-mentioned amino group concentration, and may for example be about 1 to 60 parts by weight, preferably about 5 to 50 parts by weight, and more preferably about 10 to 40 parts by weight relative to 100 parts by weight of the polyamide-series resin having an amino group at a lower concentration.

In the case where the polyamide-series resin (Ib) is a resin composition comprising a polyamide-series resin and an amino group-containing compound (e.g., (Ib-3) a composition prepared by the method (c)), the amino group concentration of the polyamide-series resin (Ib) may for example be not less than 10 mmol/kg (e.g., about 10 to 300 mmol/kg), preferably not less than 20 mmol/kg (e.g., about 20 to 200 mmol/kg), more preferably not less than 30 mmol/kg (e.g., about 30 to 150 mmol/kg), and particularly not less than 40 mmol/kg (e.g., about 40 to 100 mmol/kg).

As the amino group-containing compound, there may be used an amino group-containing compound having a relatively low molecular weight, such as a polyamine [a diamine (for example, the above-mentioned aliphatic diamines, alicyclic diamines and aromatic diamines), in addition a polyamine, for example, an aliphatic polyamine such as a polyalkylenepolyamine such as diethylenetriamine, or triethylenetetramine (e.g., a poly$C_{2-3}$alkylenepolyamine)], a monoamine, and a polyamide oligomer. The amino group-containing compound(s) may be used singly or in combination. Among these compounds, the polyamide oligomer is preferred from the viewpoint of joining (or bonding) property.

As the polyamide oligomer, there may be used a polyamide having a relatively low molecular weight, which is obtained by a conventional manner, for example, by adjusting polycondensation or other conditions and using the above-mentioned polyamide component(s). For example, as a polyamide component to be a raw material, there may be mentioned the combination of the above-mentioned diamine [e.g., an aliphatic diamine (e.g., an alkylenediamine), an alicyclic diamine, an aromatic diamine] and a dicarboxylic acid (e.g., an aliphatic dicarboxylic acid, an aromatic dicarboxylic acid), the combination of the above-mentioned diamine and/or dicarboxylic acid and the lactam (e.g., a lactam having about 4 to 20 carbon atoms, such as ω-laurolactam), and other combinations. The polyamide oligomer may be obtained by for example polymerizing the lactam and the aliphatic diamine with heating and stirring under an applied pressure.

The number average molecular weight of the polyamide oligomer is, for example, about 500 to 10,000, preferably about 500 to 8,000 (e.g., about 1,000 to 7,000), more preferably about 1,000 to 5,000, and usually about 2,000 to 6,000 (e.g., about 3,000 to 6,000). Moreover, the joining property of the polyamide-series resin constituting the resin member to the thermoplastic polyurethane can be improved by using a polyamide oligomer having a relatively high molecular weight, for example, the number average molecular weight of about 1000 to 10,000, preferably about 2,000 to 9,000, and more preferably about 3,000 to 8,000.

The polyamide oligomer usually may not have a free amino group, or may have a free amino group. In the case where the polyamide oligomer has a free amino group, the amino group may be located in at least one end of a main chain, in both ends of a main chain, or in a branched chain (s).

The amino group-containing compound (particularly a polyamide oligomer) may be used in combination with a resin such as the aliphatic polyamide-series resin, the alicyclic polyamide-series resin or the polyamide block copolymer, as a base polyamide resin.

In the case where the polyamide-series resin is composed of an amino group-containing compound and a base polyamide resin in combination, for example, the total content of the amino group in the polyamide-series resin (or composition) may be adjusted by using a polyamide-series resin having an amino group concentration of about 0 to 30 mmol/kg (preferably about 0 to 20 mmol/kg) in combination with an amino group-containing compound having an amino group concentration of about 40 to 1000 mmol/kg (preferably about 50 to 700 mmol/kg, and particularly about 100 to 500 mmol/kg).

The proportion of the amino group-containing compound may be controlled so that the content of the amino group in the polyamide-series resin (Ib) is included in the range described above. For example, the proportion of the amino group-containing compound (e.g., the polyamide oligomer) is, for example, not more than 10 parts by weight (about 0.01 to 10 parts by weight), preferably about 0.1 to 8 parts by weight, and particularly not more than 7 parts by weight (about 0.5 to 7 parts by weight) relative to 100 parts by weight of the base polyamide resin (a polyamide-series resin having an amino group at a low concentration). In the case where the proportion of the amino group-containing compound is too large, there is a possibility that use of the polyamide-series resin (Ib) particularly as a hard resin deteriorates resin property thereof.

In order to further enhance the bonded strength between the polyamide-series resin member (Ia) (e.g., a hard resin member) and the thermoplastic polyurethane-series resin member (IIa) (e.g., a soft resin member), the enthalpies of fusion and crystallization of the polyamide-series resin (Ib) may be not more than 100 J/g (e.g., about 0 to 100 J/g), preferably not more than 80 J/g (e.g., about 0 to 80 J/g), and more preferably not more than 70 J/g (e.g., about 0 to 70 J/g). According to the present invention, even using a polyamide-series resin having a low degree of crystallinity, certain and efficient joining can be ensured. The enthalpies of fusion and crystallization in such a polyamide-series resin may for example be selected from a range of not more than 30 J/g (e.g., about 0 to 30 J/g), preferably not more than 20 J/g (e.g., about 0 to 20 J/g), and more preferably not more than 17 J/g (about 0 to 17 J/g).

The "enthalpies of fusion and crystallization" of the polyamide-series resin means a value obtained by subtracting a heat of crystallization ($\Delta$Hf) generated along with crystallization of a resin from a heat of fusion ($\Delta$Hm) necessary to melt the resin. That is, in a measurement of the heat of fusion, if both the heat of crystallization and the following heat of fusion are observed along with raising the temperature, the enthalpies of fusion and crystallization of the polyamide-series resin is assessed as a value subtracted the found value $\Delta$Hf of the heat of crystallization per one gram of the resin from the found value $\Delta$Hm of the heat of fusion per one gram of the resin. The enthalpies of fusion and crystallization can be measured by a differential scanning calorimeter (DSC apparatus) based on JIS (Japanese Industrial Standards) K 7122. Incidentally, since the heat of crystallization cannot be observed in a fully amorphous polyamide, the enthalpies of fusion and crystallization of such a polyamide is qualified as 0 J/g.

The polyamide-series resin having such enthalpies of fusion and crystallization, in particular a polyamide-series resin having enthalpies of fusion and crystallization of not more than 20 J/g (e.g., a transparent polyamide) may be molded by a known molding method. The further details about of such a polyamide-series resin may for example be referred to Japanese Patent Application Laid-Open No. 239469/1996 (JP-8-239469A), Japanese Patent Application Laid-Open No. 1544/2000 (JP-2000-1544A), and others.

Incidentally, the concentration of the carboxyl group (or carboxyl group concentration) in the polyamide-series resin (Ib) is not particularly limited to a specific one, and may for example be about 0.1 to 200 mmol/kg, preferably about 0.5 to 150 mmol/kg, and more preferably about 1 to 100 mmol/kg.

In such a range that the effects of the present invention are not deteriorated, the polyamide-series resin member may comprise other resin(s) [for example, a thermoplastic resin such as a polyester-series resin, a polycarbonate-series resin, a polysulfone-series resin, a polyimide-series resin, a polyketone-series resin, a polyolefinic resin, a styrenic resin, a (meth)acrylic resin, or a halogen-containing vinyl-series resin)], various additives [for example, a filler or reinforcing agent (e.g., a reinforcing fiber), a stabilizer (e.g., a ultraviolet ray absorbing agent, an antioxidant, a heat stabilizer), a coloring agent, a plasticizer, a lubricant, a flame retardant, and an antistatic agent].

Incidentally, in accordance with the production of the molded composite article of the present invention, a "warp" sometimes occurs in the product depending on the difference between mold shrinkage factors of the resin members. In the case where the degree of the correction for the warp is large, there is a possibility that breaking of the joining part or generation of stress crack in each resin member occurs. Therefore, the polyamide-series resin preferably has lower crystallinity. The final crystallinity degree (mean final crystallinity degree) of the polyamide-series resin is advantageously not more than 50% (e.g., about 5 to 50%), preferably not more than 40% (e.g., about 5 to 40%), and more preferably not more than 30% (e.g., about 10 to 30%). In the case where a polyamide homopolymer is taken as an example and the final crystallinity degree is compared, the final crystallinity degree becomes smaller in the following order.

polyamide 66>polyamide 6$\geq$polyamide 612>polyamide 11$\geq$polyamide 12

Incidentally, considering only the final crystallinity degree, the copolymer is more advantageous than the homopolymer. Further, in general the copolymer is also more advantageous than the homopolymer from the perspective that the copolymer is superior to the homopolymer in flexibility.

It is found that, in the case of a polyamide block copolymer (a polyamide elastomer) which comprises a polyamide as a hard segment and a polyether, a polyester, or a polycarbonate or others as a soft segment, the final crystallinity degree can be adjusted by the ratio of the hard segment and the soft segment. For example, in the case where a soft segment is a polyether, large relative ratio of a polyether segment relative to a polyamide block makes the final crystallinity degree lower. Moreover, in the case comprising a branched diol as a diol component constituting a soft segment, the larger the relative ratio is, the lower the final crystallinity is. Through the use of this technique, when the final crystallinity degree of the polyamide block copolymer is adjusted to not more than 40% (e.g., about 5 to 40%), preferably not more than 35% (e.g., about 5 to 35%) and more preferably not more than 30% (e.g., about 10 to 30%), such a copolymer is advantageously used in combination with a thermoplastic polyurethane-series resin member for inhibiting warp generation, and further can provide a flexibility which suits with that of a thermoplastic polyurethane-series resin.

Therefore, the polyamide block copolymer (particularly, the polyamide elastomer) as the polyamide-series resin has an advantage over a polyamide homopolymer from the viewpoint of inhibiting a warp in the molded composite article. In particular, it is advantageous when the molded composite article is obtained by molding the polyurethane-series resin member (IIa) firstly, and thereafter molding the polyamide-series resin member (Ia) (for example, in injection molding, overmolding of a polyamide resin to an insert of a polyurethane resin molded article, and in extrusion molding, lamination or coating of a polyamide resin to a polyurethane molded article).

Incidentally, the term "the final crystallinity degree" means a degree of crystallinity measured by an X-ray diffraction analysis using a flat plate 1 mm thick, where the flat plate is formed by heating a sample resin to a temperature which is 20° C. higher than a melting point thereof, and then cooling the resin to a room temperature at a rate of 3° C./minute by means of a precision (or accurate) heat pressing machine. The melting point of the resin is measured by a differential scanning calorimeter (DSC apparatus) in accordance with JIS K 7122.

In the case where the polyamide-series resin (Ib) comprises a polyamide elastomer, high bonded strength is ensured. In particular, in the case forming a molded composite article by bringing a molten thermoplastic polyurethane-series resin (or composition) (IIb) into contact with a resin member comprising a polyamide elastomer by injection molding or other means, the polyamide-series resin member and the polyurethane-series resin member are firmly joined together, and high bonded strength can be obtained easier than the case using the polyamide homopolymer as a polyamide-series resin. In this case, there is a certain correlation between the bonded strength and the amount of the soft segment (e.g., a polyether segment) contained in the polyamide elastomer, and the amount of the soft segment relative to the polymer may be not less than 10 wt. % (e.g., about 10 to 90 wt. %), more preferably not less than 20 wt. % (e.g., about 20 to 70 wt. %), and more preferably not less than 25 wt. % (e.g., about 25 to 65 wt. %).

(Polyurethane-Series Resin)

The thermoplastic polyurethane-series resin may be obtained by reacting a diisocyanate, a diol and, if necessary, a chain-extension agent.

The diisocyanate includes an aliphatic diisocyanate such as hexamethylene diisocyanate (HMDI), or 2,2,4-trimethylhexamethylene diisocyanate; an alicyclic diisocyanate such as 1,4-cyclohexane diisocyanate, dicycloalkylmethane-4,4'-diisocyanate, or isophorone diisocyanate (IPDI); an aromatic diisocyanate such as phenylene diisocyanate, tolylene diisocyanate (TDI), or diphenylmethane-4,4'-diisocyanate (MDI); an araliphatic diisocyanate such as xylylene diisocyanate; and others. As the diisocyanate, there may also be used a compound having an alkyl group (e.g., methyl group) substituted on a main chain or ring thereof. The diisocyanate(s) may be used singly or in combination.

Examples of the diol include a polyester diol [for example, a polyester diol (aliphatic polyester diol) derived from an aliphatic dicarboxylic acid component (e.g., a $C_{4-12}$ aliphatic dicarboxylic acid such as adipic acid), an aliphatic diol component (e.g., a $C_{2-12}$ aliphatic diol such as ethylene glycol, propylene glycol, butanediol, or neopentyl glycol), and/or a lactone component (e.g., a $C_{4-12}$ lactone such as ε-caprolactone), e.g., a poly(ethylene adipate), a poly(1,4-butylene adipate), and a poly(1,6-hexylene adipate), a poly-ε-caprolactone], a polyether diol [for example, an aliphatic polyether diol, e.g., a poly(oxy$C_{2-4}$alkylene) glycol such as a polyethylene glycol, a poly(oxytrimethylene) glycol, a polypropylene glycol, or a polytetramethylene ether glycol (PTMG), and a block copolymer of the poly(oxyalkylene) glycol (e.g., a polyoxyethylene-polyoxypropylene block copolymer); an aromatic polyether diol, e.g., an adduct of an aromatic diol with an alkylene oxide, such as a bisphenol A-alkylene oxide adduct (e.g., an adduct of a $C_{2-4}$alkylene oxide such as ethylene oxide, or propylene oxide)]; a polyester ether diol (a polyester diol obtained by using the polyether diol as part of a diol component); a polycarbonate diol; and others. The diol(s) may be used singly or in combination. Among these diols, the polyester diol, or the polyether diol such as a polytetramethylene ether glycol (e.g., a polyester diol) is used in many cases.

As the chain-extension agent, there may be used a glycol [for example, a short chain glycol, e.g., a $C_{2-10}$ alkanediol such as ethylene glycol, propylene glycol, 1,4-butanediol, or 1,6-hexanediol; a bishydroxyethoxybenzene (BHEB)], and in addition a diamine [for example, an aliphatic diamine such as a $C_{2-10}$ alkylenediamine, e.g., ethylenediamine, trimethylenediamine, tetramethylenediamine, or hexamethylenediamine; an alicyclic diamine such as isophorone diamine; an aromatic diamine such as phenylenediamine, or xylylenediamine]. The chain-extension agent(s) may be used singly or in combination.

The thermoplastic polyurethane-series resin also includes a perfect thermoplastic polyurethane obtained by using a diol and a diisocyanate at a substantially equivalent amount, and an imperfect thermoplastic polyisocyanate having a small amount of a residual free (or unreacted) isocyanate, which is obtained by using a slightly excess amount of a diisocyanate relative to a diol.

Among the thermoplastic polyurethane-series resins, in particular, the thermoplastic polyurethane elastomer is preferred, which is obtained by using a diol [e.g., a diol having a polyester unit or a polyether unit (the above-mentioned polyester diol or polyether diol)], a diisocyanate, and a glycol (e.g., a short chain glycol) as the chain-extension agent. The thermoplastic polyurethane elastomer comprises a hard segment (hard block) which is composed of a polyurethane with the use of a glycol and a diisocyanate, and a soft segment (soft block) composed of a polyether diol [for example, an aliphatic polyether diol (e.g., a poly(oxyethylene) glycol)], a polyester diol (e.g., an aliphatic polyester diol) or others. The polyurethane elastomer includes, for example, a polyester urethane elastomer, a polyester ether urethane elastomer, a polyether urethane elastomer, a polycarbonate urethane elastomer, and others depending on the species of the soft segment. Among the polyurethane elastomers, the polyester urethane elastomer, the polyester ether urethane elastomer, the polyether urethane elastomer and others are preferred. Incidentally, the molecular weight (or weight-average molecular weight) of the polyether (polyoxyalkylene glycol) may for example be selected within a range from about 100 to 10000, and may be preferably about 300 to 6000 (e.g., about 300 to 5000), and more preferably about 500 to 4000 (e.g., about 500 to 3000).

The thermoplastic polyurethane-series resin(s) may be used singly or in combination.

In the case using a polyamide-series resin (including a composition) having a terminal amino group as the polyamide-series resin (Ib), a polyester polyurethane obtained from a polyester diol, in particular a polyester urethane elastomer may be used as the thermoplastic polyurethane-series resin.

In the present invention, high bonded strength is ensured by using (Ib) a polyamide-series resin (including a composition) having an amino group (e.g., a polyamide-series resin comprising at least one member selected from the group consisting of an aliphatic polyamide-series resin, an alicyclic polyamide-series resin, and an aromatic polyamide-series resin) in combination with (IIb) a thermoplastic polyurethane-series resin comprising at least one member selected from the group consisting of a polyether urethane elastomer, and a polyester ether urethane elastomer.

Moreover, (Ib) a polyamide-series resin (including a composition containing a polyamide oligomer) which contains at least a polyamide block copolymer, e.g., a polyamide elastomer may be used in combination with (IIb) a thermoplastic polyurethane-series resin comprising at least one member selected from the group consisting of a polyether urethane elastomer, a polyester urethane elastomer, and a polyester ether urethane elastomer.

In such a range that the effects of the present invention are not deteriorated, the thermoplastic polyurethane-series resin member may comprise other resin(s) (e.g., a thermoplastic resin, particularly a thermoplastic elastomer such as a polyamide-series elastomer, a polyester-series elastomer, or a polyolefinic elastomer), a stabilizer (e.g., a heat stabilizer, an ultraviolet ray absorbing agent, an antioxidant), a plasticizer, a lubricant, a filler, a coloring agent, a flame retardant, an antistatic agent, and others.

In such a molded composite article, since the polyamide-series resin has a specific amino group concentration, the polyamide-series resin and the thermoplastic polyurethane-series resin are firmly joined together without an additive. The bonded strength is usually not less than 30 N/cm, and cohesive failure sometimes occurs along with separation of the polyamide-series resin member (e.g., a hard resin member) from the thermoplastic polyurethane-series resin member (e.g., a soft resin member). The bonded strength of such a molded composite article is usually 30 N/cm to cohesive failure, preferably not less than 40 N/cm, and particularly not less than 50 N/cm (not less than 50 N/cm to cohesive failure).

[Production Process of Molded Composite Article]

The molded composite article of the present invention may be produced by joining (Ib) the polyamide-series resin (a resin comprising the polyamide-series resin) to (IIb) the thermoplastic polyurethane-series resin (a resin comprising the polyurethane-series resin) under heating. The joining may be usually ensured by heating and melting at least one resin of (Ib) the polyamide-series resin and (IIb) the thermoplastic polyurethane-series resin, and bringing the both resins into contact with each other. Such a molded composite article may for example be produced by joining the polyamide-series resin to the thermoplastic polyurethane-series resin in a molding process by means of a conventional method such as a thermoforming (e.g., a heat press molding, an injection press molding), an injection molding (e.g., an insert injection molding, a two-color (or double) injection molding, a core-back injection molding, a sandwich injection molding), an extrusion molding (e.g., a co-extrusion molding, a T-die lamination molding), or a blow molding.

For example, in a molding method such as an insert molding or an injection press molding, the both resins may be joined together by heating and melting the thermoplastic polyurethane-series resin (IIb), and molding the thermoplastic polyurethane-series resin in a molten state with contacting with at least part of a resin member (Ia) composed of the polyamide-series resin. The both resins may also be joined together by heating and melting the polyamide-series resin, and molding the polyamide-series resin (Ib) in a molten state with contacting with at least part of a resin member (IIa) composed of the thermoplastic polyurethane-series resin. Moreover, in a molding method such as a double injection molding or a co-extrusion molding, joining of the both resins may be ensured by heating and melting both the polyamide-series resin (Ib) and the thermoplastic polyurethane-series resin (I Ib) differently, and molding the molten polyamide-series resin and the molten thermoplastic polyurethane-series resin with contacting with each other. A molded composite article in which the polyamide-series resin member (Ia) is firmly joined to the polyurethane-series resin member (IIa) can be obtained by melting at least one resin selected from the polyamide-series resin and the polyurethane-series resin, bringing the polyamide-series resin into contact with the thermoplastic polyurethane-series resin for joining, and usually cooling the resulting matter. Moreover, depending on a purpose and an application, it is sufficient to join the polyamide-series resin member to the thermoplastic polyurethane-series resin member at least in part.

Incidentally, the resin can be molten by heating to a temperature of not less than a melting point thereof. In the case of a substantially uncrystallized resin, the resin can be molten by heating to a temperature of not less than a glass transition point (Tg) thereof.

According to the present invention, since the polyamide-series resin contains an amino group and the amino group acts (chemically acts) on the thermoplastic polyurethane-series resin, the bonded strength can be significantly improved even in a molded composite article obtained from a different kind of materials. Accordingly the present invention ensures such a high-level bonded strength that cannot be obtained from a physical action due to simple thermal fusing. Therefore, throughout of this specification, "thermal fusing" includes not only simple thermal fusing, but also thermal fusing (thermal joining) including a chemical reaction.

As described above, it is not particularly limited which of the resins between the polyamide-series resin and the polyurethane-series resin is molten. A soft resin (the polyurethane-series resin) having a usually lower melting point or glass transition point (Tg) may be heated, and joined to a hard resin member comprising a hard resin (the polyamide-series resin) having a higher melting point or Tg. Moreover, a hard resin (the polyamide-series resin) having a generally higher melting point or Tg may be heated, and joined to a soft resin member comprising a soft resin (the polyurethane-series resin) having a lower melting point or Tg.

Among these methods, in particular, the former method has an advantage over conventional techniques since the effects of the present invention are characteristically and effectively exhibited. In the conventional method using simple physical thermal fusing, when letting a precedently molded polyamide-series resin member joined with a followingly molding polyurethane-series resin, the molding temperature of the polyurethane-series resin becomes lower than the melting point of the precedently molded polyamide-series resin in many cases, and therefore thermal fusing is difficult to proceed. Moreover, even when the molding temperature of the polyurethane-series resin is higher than the melting point of the polyamide-series resin, the heat quantity is often insufficient to melt the surface of the polyamide-series resin member. Therefore, the conventional techniques usually never comprise such a manner as molding the polyamide-series resin member before molding the polyurethane-series resin. However, even in such a case, since the polyamide-series resin member and the thermoplastic polyurethane-series resin can be more easily joined together by an action of the amino group contained in the polyamide-series resin, the present invention can increase the freedom of the production process of the molded composite article and can also rationalize the process step to a large degree.

In the present invention, although the hard resin usually comprises the polyamide-series resin and the soft resin usually comprises the thermoplastic polyurethane-series resin in practical cases, the hard resin may comprise the thermoplastic polyurethane-series resin and the soft resin may comprise the polyamide-series resin. Moreover, the hardness of the polyamide-series resin may be the same level as that of the thermoplastic polyurethane-series resin.

To be more precise, in the heat press molding, a molded composite article may be produced by melting at least one resin of the hard resin (or composition) and the soft resin (or composition) in a metal mold of the press molding, bringing the both resins into contact with each other under an applied pressure, and joining the resins to each other. In the heat press molding, the hard resin and/or the soft resin may be filled in the metal mold in a pellet form, a powdered form or other form(s), or may be loaded to the metal mold as a molded article precedently formed by other molding method.

In the insert injection molding, a molded composite article may be produced by molding any one of the hard resin (or resin composition) or the soft resin (or resin composition) with the use of a molding method (such as an injection molding, an extrusion molding, a sheet molding, or a film molding), inserting or putting thus shaped molded article in a metal mold, and then injecting the other resin to the space or cavity between the molded article and the metal mold. In the insert injection molding, the molded article to be inserted in the metal mold is preferably pre-heated.

In the two-color (or double) injection molding, a molded composite article may be produced by injecting any one component of the hard resin (or resin composition) or the soft resin (or resin composition) to a metal mold by means of two injection molding machines or more, and exchanging cavity of the metal mold by rotation or movement of the metal mold, and injecting the other component to the space or cavity between thus obtained molded article and the metal mold.

In the core-back injection molding, a molded composite article may be produced by injecting any one component of the hard resin (or resin composition) or the soft resin (or resin composition) in a metal mold, enlarging the cavity of the metal mold, and injecting the other component to the space or cavity between thus obtained molded article and the metal mold.

Among these molding methods, particularly from the viewpoint of mass production or other properties, suitable methods are, for example, the heat press molding such as injection press molding, and the injection molding (e.g., insert injection molding, double injection molding, core-back injection molding, sandwich injection molding).

In the thermal fusing, the melting temperature (or thermal fusing temperature) of the hard resin and/or soft resin may be selected depending on the species of the both resins (or resin compositions), and may for example be selected within a range of about 100 to 300° C., preferably about 120 to 290° C., and more preferably about 150 to 280° C. For example, in the heat press molding, the melting temperature may be about 100 to 250° C., preferably about 120 to 230° C., and more preferably about 150 to 220° C. Moreover, in the injection molding, the temperature of the resin in the molding cylinder may for example be about 200 to 300° C., preferably about 220 to 280° C., and more preferably about 240 to 280° C.

The structure and configuration of the molded composite article is not particularly limited to a specific one, and may be a structure suitable for design, decorative property, touch or others. For example, such a structure may be obtained by coating or laminating part or all of the soft resin member with the hard resin member, and usually, preferably obtained by coating or laminating part or all of the hard resin member with the soft resin member (for example, obtained by coating part of the hard resin member, which contact with human body (such as a hand), with the soft resin member). Moreover, the concrete structure includes, for example, a two-dimensional structure (such as a sheet-like form, or a plate-like form), and a three-dimensional structure (such as a stick-like form, a tube-like form, a casing, or a housing).

According to the present invention, the hard resin and the soft resin can be directly and firmly joined together by thermal fusing without (going through) complicated production steps (e.g., a step for creating a concavo-convex site in the composite area, a step for coating an adhesive). Therefore, the present invention ensures to obtain a lightweight and strong molded composite article improved in properties such as design, decorative property, or good touch or texture (e.g., soft texture, flexibility).

According to the present invention, since a specific polyamide-series resin is used in combination with a thermoplastic polyurethane-series resin, even a polyamide-series resin member and a thermoplastic polyurethane-series resin member different in character from each other can be directly and firmly joined together without an adhesive. Moreover, the present invention ensures to produce a molded composite article in which a polyamide-series resin member and a thermoplastic polyurethane resin member are firmly joined together by thermal fusing in a convenient manner without going through complicated production steps.

INDUSTRIAL APPLICABILITY

The molded composite article of the present invention may be used as various industrial components (or parts), for example, an automotive part (e.g., an automotive interior part such as an instrument panel, a center panel, a center console box, a door trim, a pillar, an assist grip, a steering wheel, or an air bag cover; an automotive exterior part such as a lacing, or a bumper; an automotive functional component such as a rack and pinion boot, a suspension boot, or a constant velocity joint boot), a household electrical part (e.g., a cleaner bumper, a switch of a remote control, a key top of office automation (OA) apparatus), a product to be used in water (e.g., swimming goggles, a cover of a underwater camera), an industrial part (a cover part; various industrial parts equipped with a packing for the purpose of sealing property, water proofing property, sound insulating property, vibration insulating property, or other properties; an industrial rubber roller) an electric or electronic device part (e.g., a curl cord wire covering, a belt, a hose, a tube, a sound deadening gear), sports goods, shoes goods (e.g., athletic shoes, a shoe sole), and a part requiring design or decorative property (e.g., dark glasses, glasses).

Among them, the molded composite article is particularly suitable for a constitutive member of the shoe or the roll (e.g., a rubber roller). The constitutive member of the shoe includes a shoe part such as a shoe sole (sole), or a shoe upper, and others. Moreover, the molded composite article may form (or constitute) athletic shoes, work shoes (e.g., boots, rain shoes, shoes for gardening). In such a shoe application, since a combination of a hard or glass fiber-reinforced polyamide-series resin and a soft polyurethane-series resin, which was difficult in the past, becomes easy, it is, for example, possible to compound different grades of materials in many layers. Accordingly, the molded composite article greatly contributes to improvement in design or functionality of the shoe.

Further, in the roll (e.g., a rubber roller) application, for example, the roll may comprise an axis (shaft) in which at least the surface layer comprises a polyamide-series resin, and a thermoplastic polyurethane-series resin layer formed along the surrounding surface of the axis. The axis may be obtained by forming a polyamide-series resin layer on the surface of the metal shaft, or may be an axis comprising a polyamide-series resin. In such a roller application, since a cutting finish for obtaining a shaft precision and a surface finish of a thermoplastic polyurethane-series resin can be conducted in one operation by the same grinding machine, the production process of the roller can be significantly abbreviated and the cost can be exponentially reduced. Moreover, since such a roller given by chemically joining has high bonded strength and merely has the space or cavity between the axis and the roll, the roller can tolerate the usage in a high torque.

EXAMPLES

The following examples are intended to describe this invention in further detail and should by no means be interpreted as defining the scope of the invention.

(Evaluation of Thermal Fusing)

Molded composite articles obtained by Examples and Comparative Examples were cut into a size of 20 mm in width and 100 mm in length, respectively. In each cut piece, the tensile test was conducted by drawing the tong hold to 180° direction at a drawn speed of 20 mm/minute to determine a peel strength in the fusing interface. On the basis of the peel strength, the thermal fusing property between a hard resin member and a soft resin member was evaluated.

Example 1

To an aqueous solution (1250 g) containing a salt of hexamethylenediamine with dodecanedicarboxylic acid in a concentration of 80% by weight was added 7 g of hexamethylenediamine. The resulting mixture was heated at 220° C. under an applied pressure (inner pressure) (17.5 kgf/cm ($1.7 \times 10^6$ Pa)) in an autoclave substituted with nitrogen gas, and water was flowed out with the nitrogen gas from the reaction system for 4 hours. Subsequently, the temperature of the system was gradually increased up to 275° C. over 1 hour, and water remaining in the system was removed out of the system. Thereafter, the inner pressure of the autoclave was reduced to an atmospheric pressure. After cooling, a polyamide 612 having a terminal amino group concentration of 95 mmol/kg was obtained.

The polyamide 612 was used as a hard resin to create a flat plate (rigid plastic molded article) 100 mm wide, 100 mm long and 2 mm thick by an injection molding.

Then, about quarter area containing one side of the flat plate was covered with aluminum foil, the flat plate was inserted or put into a metal mold for flat plate having field of 100×100 mm and depth of 4 mm, and a thermoplastic polyurethane elastomer TPU (manufactured by BASF, Elastollan ET590) as an on rigid (or flexible) plastic was injection-molded to the metal mold. The injection molding of the TPU was conducted under the condition that the cylinder temperature and the metal mold temperature were 205° C. and 60° C., respectively. Thus obtained molded composite article was cut into a size of 20 mm in width to give a test piece having an end separated by aluminum foil between the polyamide resin layer (member) and the TPU layer (member). The test piece was peeled to separate the polyamide resin layer from the TPU layer using the end separated by the aluminum foil as tong hold. Measured peel strength was 90 N/cm.

Example 2

(1) Preparation of Polyamide Oligomer

An autoclave was substituted with nitrogen gas, and 1,000 g of lauryllactam and 230 g of dodecanediamine were added thereto. The resulting mixture was stirred with heating. The reaction system was gradually pressurized, maintained to 17.5 kgf/cm² ($1.7 \times 10^6$ Pa) at 270° C., and stirred for about 2 hours under heating. Then, the reaction system was cooled with gradually reducing the pressure to an atmospheric pressure, a polyamide 12 oligomer was taken out in a molten form. The resulting polyamide 12 was further cooled to give a slightly fragile solid. The number average molecular weight of the polyamide 12 oligomer was as low as about 5500. The content of the amino group in the oligomer was 400 mmol/kg.

(2) Preparation of Base Polyamide

Lauryllactam (800 g) and dodecanoic diacid (90 g) were added into a pressure vessel, and stirred at 270° C. and 20 atmosphere (about 2 MPa) for 3 hours under nitrogen gas flow. A polytetramethylene ether glycol (which has a number average molecular weight of 1300 and hydroxyl groups as both ends) (320 g) was added to thus obtained mixture, and stirred with heating under a reduced pressure. After 5 hours, a polyamide elastomer (having a terminal amino group concentration of 4 mmol/kg) to be a polyamide block copolymer was obtained.

(3) Production of Molded Composite Article

The polyamide 12 oligomer obtained from the above-mentioned item (1) was mixed with the polyamide elastomer obtained from the above-mentioned item (2) by a biaxial extruder at a proportion of 5 parts by weight of the polyamide 12 oligomer relative to the 100 parts by weight of the polyamide elastomer, and the mixture was pelletized to give a rigid plastic having a terminal amino group concentration of 20 mmol/kg.

Then, a thermoplastic polyurethane elastomer TPU (manufactured by BASF, Elastollan S95) as an on rigid plastic was injection-molded to create a flat plate (nonrigid plastic molded article) 100 mm wide, 100 mm long and 2 mm thick. About quarter area containing one side of the flat plate was covered with aluminum foil, the flat plate (nonrigid plastic molded article) was inserted into a metal mold for flat plate having field of 100×100 mm² and depth of 4 mm, and a rigid plastic was injection-molded. The injection molding of the rigid plastic was conducted under a condition that the cylinder temperature and the metal mold temperature were 220° C. and 60° C., respectively. Thus obtained molded composite article was cut into a size of 20 mm in width to give a test piece having an end separated by aluminum foil between the polyamide resin layer (member) and the TPU layer (member). The test piece was peeled to separate the polyamide resin layer from the TPU layer using the end separated by the aluminum foil as tong hold. Measured peel strength was 100 N/cm.

Example 3

In an autoclave substituted with nitrogen gas, a salt (1000 g) of bis(4-aminocyclohexyl)methane and dodecanedicarboxylic acid was heated at 220° C. under an applied pressure (inner pressure) (17.5 kgf/cm$^2$ (1.7×10$^6$ Pa)), and water in the reaction system was discharged with the nitrogen gas from the reaction system for 4 hours. Subsequently, the temperature of the system was gradually increased up to 275° C. over 1 hour, and residual water was removed. Thereafter, the inner pressure of the autoclave was reduced to an atmospheric pressure. After cooling, a transparent polyamide having a terminal amino group concentration of 30 mmol/kg was obtained.

The transparent polyamide was used as a rigid plastic to create a flat plate (rigid plastic molded article) 100 mm width, 100 mm long and 2 mm thick by an injection molding.

The heat of crystallization and the heat of fusion of the transparent polyamide flat plate was measured at a heating speed of 10° C./min. by a DSC analysis apparatus to show a heat of crystallization ΔHf of 11 J/g near 170° C., and a heat of fusion ΔHm of 25 J/g near 250° C. Based on the heat of crystallization and heat of fusion, the enthalpies of fusion and crystallization of the molded article was determined as 14 J/g.

Then, about quarter area containing one side of the flat plate was covered with aluminum foil, the flat plate (rigid plastic molded article) was inserted or put into a metal mold for flat plate having field of 100×100 mm$^2$ and depth of 4 mm, and a thermoplastic polyurethane elastomer TPU (manufactured by BASF, Elastollan 1195ATR) as a nonrigid plastic was molded or injection-molded to the metal mold. The injection molding of the TPU was conducted under a condition that the cylinder temperature and the metal mold temperature were 205° C. and 60° C., respectively. Thus obtained molded composite article was cut into a size of 20 mm in width to give a test piece having an end separated by aluminum foil between the polyamide resin layer (member) and the TPU layer (member). The test piece was peeled to separate the polyamide resin layer from the TPU layer using the end separated by the aluminum foil as tong hold. Measured peel strength was 130 N/cm.

Example 4

In the presence of a small amount of phosphoric acid, ω-lauryllactam (1000 g) was heated at a temperature of about 250 to 260° C. in an autoclave substituted with nitrogen gas, and water in the system was discharged outside of the system with nitrogen gas for 4 hours. Subsequently, the temperature of the system was gradually increased up to 275° C. over 1 hour, and water remaining in the system was removed out of the system. After cooling, a polyamide 12 having a terminal amino group concentration of 30 mmol/kg was obtained.

A molded composite article was produced in the same manner as in Example 3 except for using the polyamide 12 as a rigid plastic. The molded composite article had the enthalpies of fusion and crystallization of the rigid plastic molded article of 65 J/g and the peel strength of 60 N/cm.

Comparative Example 1

A polyamide 612 was obtained in the same manner as in Example 1 except that dodecanedicarboxylic acid (15 g) instead of hexamethylenediamine was added to the aqueous solution containing a salt of hexamethylenediamine with dodecanedicarboxylic acid in a concentration of 80% by weight. The resulting polyamide 612 had a terminal amino group concentration of 7 mmol/kg.

A molded composite article was produced in the same manner as in Example 1 except for using the polyamide 612 as a rigid plastic. The peel strength of the molded article was 5 N/cm.

Comparative Example 2

A molded composite article was obtained as the same manner as in Example 2 except that the polyamide elastomer (having a terminal amino group content of 4 mmol/kg) of Example 2 was used alone as a rigid plastic without mixing the oligomer. The molded composite article had the peel strength of 30 N/cm.

Examples 5 to 19 and Comparative Examples 3 to 6

(1) Preparation of Polyamide-Series Resin

A polyamide, a polyamide oligomer, and a polyamide blend were prepared according to the following procedures.

(A1) PA12

ω-lauryllactam (1000 g) and dodecanedicarboxylic acid (10 g) were heated at 250 to 260° C. in the presence of a small amount of phosphoric acid in an autoclave substituted with nitrogen gas to discharge water in the system together with nitrogen gas over 4 hours. Subsequently, the temperature of the system was gradually increased up to 275° C. over 1 hour to remove residual water out of the system, and the system was cooled to give a polyamide 12 (A1) having an amino group concentration of 7 mmol/kg, and a carboxyl group concentration of 81 mmol/kg.

(A2) PA12

A polyamide 12 (A2) was obtained by operating in the same manner as in the case of the above-mentioned (A1) except for using hexamethylenediamine (60 g) instead of dodecanedicarboxylic acid, and the polyamide 12 (A2) had an amino group concentration of 72 mmol/kg and a carboxyl group concentration of 4 mmol/kg.

(A3) PA612

To an aqueous solution (1250 g) containing a salt of hexamethylenediamine with dodecanedicarboxylic acid in a concentration of 80% by weight was added 5 g of dodecanedicarboxylic acid. The resulting mixture was heated at 220° C. under an applied pressure (inner pressure) (17.5 kgf/cm$^2$ (1.7×10$^6$ Pa)) in an autoclave substituted with nitrogen gas, and water was flowed out with the nitrogen gas from the reaction system for 4 hours. Subsequently, the temperature of the system was gradually increased up to 275° C. over 1 hour, and water remaining in the system was removed out of the system. Thereafter, the inner pressure of the autoclave was reduced to be an atmospheric pressure. After cooling, a polyamide 612 (A3) having an amino group concentration of 4 mmol/kg and a carboxyl group concentration of 35 mmol/kg was obtained.

(A4) PA612

By operating in the same manner as in Example 1, and a polyamide 612 (A4) was obtained having an amino group concentration of 97 mmol/kg and a carboxyl group concentration of 27 mmol/kg.

(A5) Polyamide Elastomer PAE

In the same manner as in the preparation (2) of Example 2, a polyamide elastomer (A5) having an amino group concentration of 4 mmol/kg and a carboxyl group concentration of 50 mmol/kg was obtained.

(A6) PA6

ε-caprolactam (1000 g) and hexamethylenediamine (100 g) were heated at 270 to 280° C. in the presence of a small amount of phosphoric acid in an autoclave substituted with nitrogen gas to discharge water in the system together with nitrogen gas over 5 hours. Then, the system was cooled to give a polyamide 6 (A6) having an amino group concentration of 103 mmol/kg, and a carboxyl group concentration of 45 mmol/kg.

(A7) Alicyclic Polyamide

An alicyclic polyamide (A7) was prepared in the same manner as in the case of the above-mentioned (A3) except that bis(4-aminocyclohexyl)methane and dodecanedicarboxylic acid were used as a monomer component and that dodecanedicarboxylic acid was not added to the system. The resulting alicyclic polyamide (A7) had an amino group concentration of 42 mmol/kg and a carboxyl group concentration of 78 mmol/kg.

(OL) Polyamide Oligomer

A polyamide oligomer (OL) was prepared in the same manner as in Example 2 (1). Thus obtained polyamide oligomer (OL) had a number average molecular weight of about 5700, an amino group content of 342 mmol/kg, and a carboxyl group content of 0 mmol/kg.

(Polyamide Blend)

Components shown in Table 1 (the polyamide resins, the polyamide elastomer and the polyamide oligomer, each obtained by the above-mentioned manner) were mixed at a mixing ratio (weight ratio) shown in Table 1 to prepare sample resins (polyamide resin blends) by kneading with a biaxial extruder. The sample resins were different in amino group concentration from each other.

(2) Production of Molded Composite Article, and Peeling Test Thereof

A molded composite article was formed with the polyamide-series resin (PA) shown in Table 1, and a thermoplastic polyurethane elastomer TPU (manufactured by BASF, S95). The molded article was cut into a size of 20 mm in width, and the end of the molded composite article was separated by aluminum foil. The separated ends of the PA member (layer) and the TPU member (layer) were used as tong holds, and the peeling test was conducted.

Incidentally, the molded composite article was formed by covering about quarter area containing one side of a molded article formed with a polyamide-series resin (flat plate 100 mm wide, 100 mm long and 2 mm thick, formed by an injection molding) with aluminum foil, and putting or setting the resin member into a metal mold for flat plate having field of 100×100 mm² and depth of 4 mm, and injecting or injection-molding the TPU in the metal mold. The injection molding of the TPU was carried out under a condition that the cylinder temperature and the metal mold temperature were 205° C. and 60° C., respectively.

The results are shown in Table 1.

TABLE 1

| | Polyamide resin | | Content of terminal group (mmol/kg) | | Peeling strength (N/cm) |
|---|---|---|---|---|---|
| | | | Carboxyl group | Amino group | |
| Com. Ex. 3 | PA12 | A1 | 81 | 7 | 24 |
| Ex. 5 | | A1/A2 = 75/25 | 64 | 24 | 90 |
| Ex. 6 | | A1/A2 = 50/50 | 43 | 40 | 115 |
| Ex. 7 | | A2 | 4 | 72 | 130 |
| Com. Ex. 4 | | A1/OL = 99.5/0.5 | 81 | 9 | 26 |
| Ex. 8 | | A1/OL = 97/3 | 79 | 17 | 65 |
| Ex. 9 | | A1/OL = 95/5 | 77 | 24 | 95 |
| Com. Ex. 5 | PA612 | A3 | 35 | 4 | 10 |
| Ex. 10 | | A3/A4 = 75/25 | 33 | 27 | 75 |
| Ex. 11 | | A3/A4 = 50/50 | 31 | 51 | 100 |
| Ex. 12 | | A4 | 27 | 97 | 110 |
| Ex. 13 | | A3/OL = 95/5 | 33 | 21 | 80 |
| Com. Ex. 6 | PAE | A5 | 50 | 4 | 21 |
| Ex. 14 | | A5/OL = 98/2 | 49 | 15 | 103 |
| Ex. 15 | | A5/OL = 95/5 | 48 | 21 | 104 |
| Ex. 16 | | A5/OL = 90/10 | 45 | 38 | 110 |
| Ex. 17 | PA6 | A6 | 45 | 103 | 110 |
| Ex. 18 | Alicyclic PA | A7 | 78 | 42 | 140 |
| Ex. 19 | | A7/OL = 90/10 | 70 | 72 | 145 |

Incidentally, in the case where a molded composite article was produced in the same manner as described above except that the molded article (resin member) formed with the TPU was used instead of the resin member formed with the polyamide-series resin, and that the injection molding was conducted by using a polyamide-series resin A3/A4 (75/25), A3/A4 (50/50), or A4, instead of the TPU for injection molding, peel strength of the resulting molded composite article was 95 N/cm (A3/A4=75/25), 130 N/cm (A3/A4=50/50), or 150 N/cm (A4).

Example 20 and Comparative Example 7

Molded composite articles were produced in the same manner as in Example 5 except that resin members formed with various thermoplastic polyurethane elastomers (TPU) shown in Table 2 were used instead of the resin member formed with the polyamide-series resin, and that the polyamide resins A1 and A2 obtained in Example 5 were used in Comparative Example 7 and Example 20, respectively, instead of the TPU for injection molding. The peeling test was conducted, and the results are shown in Table 2. Incidentally, Table 2 also shows the Shore A hardness and type of the used TPU.

TABLE 2

| Manufac- | | | | Peeling strength (N/m) | |
|---|---|---|---|---|---|
| turing corporations | Grade | Shore A hardness | Type | Ex. 20 (A2) | Com. Ex. 7 (A1) |
| BASF | S95 | 95 | Ester | 123 | 24 |
| | 1195 | 95 | Ether | 129 | 28 |
| | C90 | 90 | Ester (water resistant type) | 84 | 22 |
| | ET590 | 90 | Ester (transparent type) | >150*) | 19 |
| | ET690 | 90 | Ester (for injection) | 90 | 28 |

TABLE 2-continued

| Manufac-turing corporations | Grade | Shore A hardness | Type | Peeling strength (N/m) | |
|---|---|---|---|---|---|
| | | | | Ex. 20 (A2) | Com. Ex. 7 (A1) |
| | ET885 | 85 | Ether (for injection, cold resistant type) | 97 | 27 |
| Nippon Polyurethane Industry Co., Ltd. | E580 | 80 | Ester | 90 | 7 |
| | E980 | 80 | Carbonate | 65 | 6 |
| | E380 | 80 | Ether | >150*) | 16 |

In Table, the symbol "*" indicates that the slight peeling was observed and the substrate (A2 or TPU) was broken.

Examples 21 to 25

(1) Preparation of Base Polyamide (Polyamide Elastomer (A8))

In a pressure vessel, lauryllactam (800 g) and dodecanoic diacid (90 g) were added, and stirred at 270° C. and 20 atmospheres (about 2 MPa) for 3 hours under nitrogen gas flow. A polytetramethylene ether glycol (having a number average molecular weight of 1300 and a terminal hydroxyl group) (290 g) was added to the resulting mixture, and heated and stirred under a reduced pressure. After 5 hours, a polyamide elastomer (A8) having an amino group concentration of 4 mmol/kg and a carboxyl group concentration of 50 mmol/kg was obtained.

(2) Production of Molded Composite Article, and Peeling Test Thereof

The polyamide elastomer (A8) and the polyamide oligomer (OL) described in the paragraph of Examples 5 to 19 were used at a mixing ratio [the former/the latter] of 100/5 (weight ratio), and were kneaded by a biaxial extruder to prepare a sample resin (polyamide resin blend) having a terminal carboxyl group concentration of 40 mmol/kg and a terminal amino group concentration of 25 mmol/kg.

A molded composite article was formed with thus obtained polyamide-series resin (PA) and the TPU shown in Table 3. The molded composite article was cut into a size of 20 mm in width, and the end of the molded composite article was separated by aluminum foil. The separated ends of the PA member (layer) and the TPU member (layer) were used as tong holds, and the peeling test was conducted. As the TPU, an ester-series TPU (manufactured by BASF, 195-50ET) and an ether-series TPU (manufactured by BASF, ET890-10) were used.

Incidentally, the molded composite article was formed by covering about quarter area containing one side of a molded article formed with the TPU (a flat plate 100 mm wide, 100 mm long and 2 mm thick, formed by an injection molding) with aluminum foil, and inserting the resin member into a metal mold for flat plate having field of 100×100 mm² and depth of 4 mm, and injecting or injection-molding the PA in the metal mold. The injection molding of the PA was carried out under a condition of a joining temperature (cylinder temperature) shown in Table 3 and a metal mold temperature of 60° C.

The results are shown in Table 3.

TABLE 3

| | Content of terminal group of PA (mmol/kg) | | | Joining | Peeling |
|---|---|---|---|---|---|
| | Carboxyl group | Amino group | TPU | temperature (° C.) | strength (N/cm) |
| Ex. 21 | 40 | 25 | Ester-series (195-50ET) | 230 | 42 |
| Ex. 22 | 40 | 25 | Ester-series (195-50ET) | 250 | 76 |
| Ex. 23 | 40 | 25 | Ester-series (195-50ET) | 270 | 82 |
| Ex. 24 | 40 | 25 | Ether-series (ET890-10) | 250 | 58 |
| Ex. 25 | 40 | 25 | Ether-series (ET890-10) | 270 | 53 |

Examples 26 to 29

The polyamide elastomer (PAE) (A5) and the polyamide oligomer (OL) described in the paragraph of Examples 5 to 19 were used at a mixing ratio shown in Table 4, and were kneaded by a biaxial extruder to prepare a sample resin (polyamide resin blend). The terminal carboxyl group concentration and the terminal amino group concentration of thus obtained polyamide blend were also shown in Table 4.

A molded composite article was formed with thus obtained polyamide-series resin blend (PA) and the TPU shown in Table 4. The molded composite article was cut into a size of 20 mm in width, and the end of the molded composite article was separated by aluminum foil. The separated ends of the PA member (layer) and the TPU member (layer) were used as tong holds, and the peeling test was conducted.

Incidentally, the molded composite article was formed by covering about quarter area containing one side of a molded article formed with the TPU (a flat plate 100 mm wide, 100 mm long and 2 mm thick, formed by an injection molding) with aluminum foil, and inserting the resin member into a metal mold for flat plate having field of 100×100 mm² and depth of 4 mm, and injecting or injection-molding the PA in the metal mold. The injection molding of the PA was carried out under a condition that the joining temperature (cylinder temperature) and the metal mold temperature were 250° C. and 60° C., respectively. As the TPU, an ester-series TPU (manufactured by BASF, 195-50ET) and an ether-series TPU (manufactured by BASF, ET890-10) were used.

The results are shown in Table 4.

TABLE 4

| | | Content of terminal group (mmol/kg) | | | Peeling |
|---|---|---|---|---|---|
| | PAE/OL | Carboxyl group | Amino group | TPU | strength (N/cm) |
| Ex. 26 | 90/10 | 36 | 40 | Ether-series (ET890-10) | 88 |
| Ex. 27 | 80/20 | 29 | 61 | Ether-series (ET890-10) | 100 |
| Ex. 28 | 90/10 | 36 | 40 | Ester-series (195-50ET) | 190 |
| Ex. 29 | 80/20 | 29 | 61 | Ester-series (195-50ET) | 110 |

Examples 30 to 35

(1) Preparation of base Polyamide (Polyamide Elastomer (A9))

Lauryllactam (800 g) and dodecanoic diacid (90 g) were added into a pressure vessel, and stirred at 270° C. and 20 atmosphere (about 2 MPa) for 3 hours under nitrogen gas flow. A polytetramethylene ether glycol (which has a number average molecular weight of 1300 and hydroxyl groups as both ends) (320 g) was added to thus obtained mixture, and stirred for 5 hours with heating under a reduced pressure. After completion of the reaction, the reduced pressure was released. Octamethylenediamine (60 g) was further added to the vessel, and stirred at 270° C. for 1 hour under an atmospheric pressure. Then, the resulting product was gradually cooled to give a polyamide elastomer having a terminal amino group (having a terminal carboxyl group concentration of 12 mmol/kg and a terminal amino group concentration of 42 mmol/kg) (A9).

(2) Production of Molded Composite Article, and Peeling Test Thereof

Sample resins were prepared by kneading with a biaxial extruder with the polyamide elastomer (A9) alone, or the mixture of the polyamide elastomer (A9), the polyamide elastomer (PAE) obtained in Example 2 and the polyamide oligomer (OL) described in the paragraph of Examples 5 to 19 at a mixing ratio (weight ratio) of PAE/A9/OL=10/80/10. Incidentally, the polyamide resin blend comprising the polyamide elastomer (PAE) and the polyamide elastomer (A9) and the polyamide oligomer (OL) had a terminal carboxyl group concentration of 33 mmol/kg and a terminal amino group concentration of 46 mmol/kg.

A molded composite article was formed with thus obtained sample resin (PA) and the TPU shown in Table 5. The molded composite article was cut into a size of 20 mm in width, and the end of the molded composite article was separated by aluminum foil. The separated ends of the PA member (layer) and the TPU member (layer) were used as tong holds, and the peeling test was conducted.

Incidentally, in Examples 30, 31, 34 and 35, the molded composite article was formed by covering about quarter area containing one side of a molded article formed with the TPU (flat plate 100 mm wide, 100 mm long and 2 mm thick, formed by an injection molding) with aluminum foil, and putting the resin member into a metal mold for flat plate having field of 100×100 mm and depth of 4 mm, and injecting or injection-molding the PA in the metal mold. The injection molding of the PA was carried out under a condition that the joining temperature (cylinder temperature) and the metal mold temperature were 250° C. and 60° C., respectively.

Moreover, in Examples 32 and 33, the molded composite article was obtained in the same manner as in the above-mentioned manner except that a molded article formed with the PA was used instead of a molded article formed with the TPU and that the injection molding was conducted by using the TPU instead of the PA, and was subjected to a peeling test.

Incidentally, as the TPU, an ester-series TPU (manufactured by BASF, ET195) and an ether-series TPU (manufactured by BASF, ET890) were used.

The results are shown in Table 5.

TABLE 5

| | | Content of terminal group (mmol/kg) | | | Peeling strength (N/cm) |
|---|---|---|---|---|---|
| | PA | Carboxyl group | Amino group | TPU | |
| Ex. 30 | A9 | 12 | 42 | Ester-series (ET195) | 125 |
| Ex. 31 | A9 | 12 | 42 | Ether-series (ET890) | 160 |
| Ex. 32 | A9 | 12 | 42 | Ester-series (ET195) | 130 |
| Ex. 33 | A9 | 12 | 42 | Ether-series (ET890) | 130 |
| Ex. 34 | PAE/A9/OL 80/10/10 | 33 | 46 | Ester-series (ET195) | 140 |
| Ex. 35 | PAE/A9/OL 80/10/10 | 33 | 46 | Ether-series (ET890) | 95 |

Examples 36 to 40

(1) Preparation of Base Polyamide (Polyamide Elastomers (A10) to (A12))

Each of polyamide elastomers (A10) to (A12) was prepared in the same manner as in the polyamide elastomer (A5) except that dodecanoic diacid (DDA) and polytetramethylene ether glycol (PTMG) were used at a proportion shown in Table 6, and thus obtained polyamide elastomers (A10) to (A12) had an amino group concentration of 4 mmol/kg. Table 6 also shows the content (wt. %) of polyether segment in thus obtained polyamide elastomers.

TABLE 6

| | DDA (g) | PTMG (g) | Content of polyether segment (wt. %) |
|---|---|---|---|
| (A10) | 55 | 214 | 20 |
| (A11) | 25 | 92 | 10 |
| (A12) | 10 | 43 | 5 |

(2) Preparation of Sample Resin

A polyamide elastomer (90 parts by weight) and the polyamide oligomer (OL) used in Example 8 (10 parts by weight) were kneaded by a biaxial extruder to prepare a sample resin (Examples 36 to 39). Incidentally, the polyamide resin blends comprising the polyamide elastomer and the polyamide oligomer (OL) had an amino group concentration of 38 mmol/kg.

Moreover, the polyamides (A1) and (A2) were used at a mix ratio of 50/50 (weight ratio), and kneaded by a biaxial extruder to give a sample resin (Example 40).

(3) Peeling Test

Thus obtained sample resin (PA), and a polyether-series TPU (manufactured by BASF, ET890-10) or a polyester-series TPU (manufactured by BASF, 195-50ET) were employed to form a molded composite article. The composite article was cut into a size of 20 mm in width, and the end of the molded composite article was separated by aluminum foil. The separated ends of the PA member (layer) and the TPU member (layer) were used as tong holds, and the peeling test was conducted.

Incidentally, the molded composite article was formed by covering about quarter area containing one side of a molded article formed with the TPU (a flat plate 100 mm wide, 100 mm long and 2 mm thick, formed by an injection molding) with aluminum foil, and inserting this resin member into a metal mold for flat plate having field of 100×100 mm² and depth of 4 mm, and injecting or injection-molding the PA in the metal mold. The injection molding of the PA was carried out under a condition of a joining temperature (cylinder temperature) of 250° C. and a metal mold temperature of 60° C.

The results are shown in Table 7. Further, Table 7 also shows the content (wt. %) of the polyether segment in the polyamide elastomer or polyamide, and the melting point of the polyamide elastomer or polyamide.

TABLE 7

|  | Polyamide elastomer or polyamide | | | Peeling strength (N/cm) | |
|---|---|---|---|---|---|
|  | PA (mix ratio) | Content of polyether segment (wt. %) | Melting point (° C.) | Ether-series TPU | Ester-series TPU |
| Ex. 36 | A5/OL 90/10 | 26 | 169 | 94 | 116 |
| Ex. 37 | A10/OL 90/10 | 20 | 171 | 101 | 108 |
| Ex. 38 | A11/OL 90/10 | 10 | 176 | 82 | 92 |
| Ex. 39 | A12/OL 90/10 | 5 | 177 | 70 | 85 |
| Ex. 40 | A1/A2 50/50 | 0 | 178 | 72 | 85 |

Example 41

Measurement of Warp

The polyether-series TPU (manufactured by BASF, ET890-10) was employed to create a flat plate 100 mm wide, 100 mm long and 2 mm thick by an injection molding. Then, the TPU flat plate was inserted or placed into a metal mold for flat plate having field of 100×100 mm² and depth of 4 mm, and the PA (polyamide elastomer or polyamide) shown in Table 8 was injection-molded to the metal mold to give a molded composite article. Incidentally, the injection molding of the PA was conducted under a condition that the metal mold temperature and the temperature of the injected PA resin were 60° C. and 250° C., respectively.

Thus obtained molded composite article was cut into a size of 20 mm in width to create a test sample. In thus obtained sample, the PA layer was constricted, the TPU layer was elongated, and the sample was curved to the longitudinal direction. The TPU layer in one end of the longitudinal direction of the sample was fixed to a surface plate, and the distance between the hemline of the other end and the surface plate was measured and determined as a warp degree.

The results are shown in Table 8. Table 8 also includes the content of the polyether segment in the polyamide elastomer or polyamide, and the final crystallinity degree. Incidentally, the final crystallinity degree was measured according to the above-mentioned method.

TABLE 8

| PA | A5 | A10 | A11 | A12 | A2 |
|---|---|---|---|---|---|
| Content of polyether segment (wt. %) | 26 | 20 | 10 | 5 | 0 |
| Final crystallinity degree (%) | 30 | 35 | 40 | 42 | 45 |
| Warp (mm) | 7 | 8 | 10 | 15 | 18 |

The invention claimed is:

1. A molded composite article which comprises:
   (Ia) a resin member comprising a polyamide-series resin; and
   (IIa) a resin member comprising a thermoplastic polyurethane-series resin, wherein
   the resin member (Ia) is directly joined or bonded to the resin member (IIa), and the polyamide-series resin has an amino group in a proportion of not less than 10 mmol/kg, and
   the resin member (IIa) consists essentially of (i) the thermoplastic polyurethane-series resin or (ii) the thermoplastic polyurethane-series resin and an additive selected from the group consisting of a resin other than the polyurethane-series resin, a stabilizer, a plasticizer, a lubricant, a filler, a coloring agent, a flame retardant, an antistatic agent and mixtures thereof.

2. A molded composite article according to claim 1, wherein the polyamide-series resin constituting the resin member (Ia) is the following resin (A) or (B):
   (A) a polyamide-series resin which is (Ib-1) a single polyamide-series resin, or (Ib-2) a mixture of a plurality of polyamide-series resins each having different amino group content from each other, and which has an amino group in a proportion of not less than 20 mmol/kg,
   (B) a polyamide-series resin which is (Ib-3) a resin composition containing a polyamide-series resin and a compound having an amino group, and which has an amino group in a proportion of not less than 10 mmol/kg.

3. A molded composite article according to claim 1, wherein the polyamide-series resin constituting the resin member (Ia) comprises at least one member selected from the group consisting of an aliphatic polyamide-series resin, an alicyclic polyamide-series resin, an aromatic polyamide-series resin, and a polyamide block copolymer.

4. A molded composite article according to claim 2, wherein, in the resin composition (Ib-3), the compound having an amino group comprises at least one member selected from the group consisting of a monoamine, a polyamine, and a polyamide oligomer.

5. A molded composite article according to claim 2, wherein, in the resin composition (Ib-3), the proportion of the compound having an amino group is 0.01 to 10 parts by weight relative to 100 parts by weight of the base polyamide-series resin.

6. A molded composite article according to claim 1, wherein the polyamide-series resin constituting the resin member (Ia) comprises a polyamide oligomer, and at least one base polyamide resin selected from the group consisting of an aliphatic polyamide-series resin, an alicyclic polyamide-series resin, and a polyamide block copolymer.

7. A molded composite article according to claim 1, wherein the thermoplastic polyurethane-series resin comprises a thermoplastic polyurethane elastomer.

8. A molded composite article according to claim 1, wherein the polyamide-series resin has a terminal amino group, and the thermoplastic polyurethane-series resin comprises a polyester polyurethane containing a polyester diol as a constitutive unit.

9. A molded composite article according to claim 1, wherein the polyamide-series resin constituting the resin member (Ia) comprises at least one member selected from the group consisting of an aliphatic polyamide-series resin, an alicyclic polyamide-series resin, and an aromatic polyamide-series resin, and the thermoplastic polyurethane-series resin comprises at least one member selected from the group consisting of a polyether urethane elastomer, a polyester ether urethane elastomer, and a polycarbonate urethane elastomer.

10. A molded composite article according to claim 1, wherein the polyamide-series resin constituting the resin member (Ia) comprises at least a polyamide block copolymer, and the thermoplastic polyurethane-series resin comprises at least one member selected from the group consisting of a polyether urethane elastomer, a polyester urethane elastomer, a polyester ether urethane elastomer, and a polycarbonate urethane elastomer.

11. A molded composite article according to claim 10 wherein the polyamide block copolymer is a polyamide elastomer having in a molecule thereof at least one member selected from the group consisting of a polyether segment, a polyester segment, and a polycarbonate segment.

12. A molded composite article according to claim 1, which is a member of a shoe or a roll.

13. A molded composite article according to claim 4, wherein in the resin composition (Ib-3), the compound having an amino group comprises a polyamide oligomer.

14. A molded composite article according to claim 6, wherein the polyamide-series resin constituting the resin member (Ia) comprises a polyamide oligomer and a polyamide block copolymer.

15. A molded composite article according to claim 10, wherein the thermoplastic polyurethane-series resin comprises a polyester urethane elastomer.

16. A molded composite article according to claim 11, wherein the polyamide block copolymer is a polyamide elastomer having in a molecule thereof a polyether segment.

17. A process for producing a molded composite article recited in claim 1, which comprises heating at least one resin selected from the group consisting of (Ib) a resin comprising a polyamide-series resin recited in claim 1 and (IIb) a resin comprising a thermoplastic polyurethane-series resin to join one resin to the other resin.

18. A process according to claim 17, wherein the thermoplastic polyurethane-series resin is melted or fused under heating, and the molten thermoplastic polyurethane-series resin is brought into contact with at least part of a resin member comprising the polyamide-series resin for uniting both resins.

19. A process according to claim 17, wherein the polyamide-series resin is melted or fused under heating, and the molten polyamide-series resin is brought into contact with at least part of a resin member comprising the thermoplastic polyurethane-series resin for uniting both resins.

20. A process according to claim 17, wherein the polyamide-series resin and the thermoplastic polyurethane-series resin are independently melted or fused under heating, and the molten polyamide-series resin is brought into contact with the molten thermoplastic polyurethane-series resin for uniting both resins.

21. A process according to claim 17, wherein the polyamide-series resin and the thermoplastic polyurethane-series resin are joined and united by a molding method selected from the group consisting of a thermoforming, an injection molding, an extrusion molding, and a blow molding.

* * * * *